US 6,571,217 B1

(12) United States Patent
Anderson et al.

(10) Patent No.: US 6,571,217 B1
(45) Date of Patent: May 27, 2003

(54) SYSTEM AND METHOD FOR OPPORTUNISTIC UPGRADING OF AN IMAGE

(75) Inventors: Jeff M. Anderson, Vancouver, WA (US); David Hall, Vancouver, WA (US); Stephen D. Dentel, Vancouver, WA (US); Sherri L. Brown, Clackamas, OR (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/507,257

(22) Filed: Feb. 18, 2000

(51) Int. Cl.[7] ............................................. G06F 17/60
(52) U.S. Cl. ......................................... 705/14; 709/219
(58) Field of Search ....................... 705/14, 1; 709/217, 709/218, 219

(56) References Cited

U.S. PATENT DOCUMENTS

| 5,845,084 | A | * | 12/1998 | Cordell et al. | ......... | 395/200.64 |
| 5,959,623 | A | | 9/1999 | van Hoff et al. | | |
| 6,009,410 | A | | 12/1999 | LeMole et al. | | |
| 6,202,087 | B1 | * | 3/2001 | Gadish | ....................... | 709/206 |
| 6,243,761 | B1 | * | 6/2001 | Mogul et al. | ............... | 709/246 |

FOREIGN PATENT DOCUMENTS

JP 11015753 A * 1/1999

OTHER PUBLICATIONS

Allen, Jules, "Be receptive to browser plug–ins", Feb. 16, 1998, St. Petersburg Times, Edition: 0 South Pinellas, Section: Business, p. 13.*

* cited by examiner

Primary Examiner—Jeffrey D. Carlson

(57) ABSTRACT

A system and method are provided for updating a banner in a graphical display. In embodiment, the system comprises a processor circuit in a client device that includes a processor and a memory, both of which are electrically coupled to a local interface. The local interface may comprise, for example, a data bus and accompanying control bus. Also electrically coupled to the local interface is a network interface such as a network card that couples a network to the local interface. The system includes a display device electrically coupled to the local interface. The system further includes banner update logic stored on the memory and executable by the processor. The banner update logic particularly comprises logic to automatically initiate a download of a remote banner located at a predefined address on the network to the memory, and logic to display a local banner stored in the memory on the display device upon a failure to download the remote banner to the memory. The banner update logic may further comprise logic to display the remote banner on the display device upon a successful download of the remote banner to the memory.

17 Claims, 6 Drawing Sheets

SYSTEM AND METHOD FOR OPPORTUNISTIC UPGRADING OF AN IMAGE

TECHNICAL FIELD

The present invention is generally related to the field or graphical display of images and, more particularly, is related to a system and method for updating images in a graphical display.

BACKGROUND OF THE INVENTION

More and more, manufacturers of computer technology are providing internet related features and services along with their products, both to make such products more useful and to enhance marketability. For example, a computer manufacturer may oftentimes provide Internet access to those customers who purchase a computer therefrom. Manufacturers of printers may also provide various printing software along with the sale of a printer that gives customers additional applications for the printer in question.

Manufacturers of computer technology also may wish to include software that allows the advertisement of additional products or services they provide to users who purchase their products. For example, a manufacturer may include software with computer products that causes various text and images to be produced on a display screen as part of an appropriate graphical user interface to advertise special features or services to users.

To include such advertisements for features or services offered by a particular computer technology manufacturer with a product sold, the software that includes the advertisement may be stored in an appropriate storage medium such as a compact disk, etc., that is packaged with the product such as, for example, a printer before shipment to the end user. Unfortunately, significant manufacturing lead times may be required to reduce the software to the storage mediums and to package the software with the products sold by the manufacturer. In addition, some manufacturers may seek to create a significant inventory of product before it is actually released to the public so that a proper supply is available to meet the new demand for the product. These lead times may amount to several months.

During the time that software is stored, packaged, and actually sold to an end user, it is possible that the advertisements for the features and services contained within the software included with a manufacturer's product may be obsolete. Specifically, during this time period new features or services may be available to accompany the end product including Internet services, etc. Also, additional software applications may be made available via the Internet, etc. that the end user may wish to employ. Also, new products may be released that a manufacturer may wish to bring to the attention to the user.

SUMMARY OF THE INVENTION

The present invention provides a system and method for updating a banner in a graphical display. Briefly described, in architecture, the system comprises a processor circuit in a client device that includes a processor and a memory, both of which are electrically coupled to a local interface. The local interface may comprise, for example, a data bus and accompanying control bus. Also electrically coupled to the local interface is a network interface such as a network card that couples a network to the local interface. The system includes a display device electrically coupled to the local interface.

The system further includes banner update logic stored on the memory and executable by the processor. The banner update logic particularly comprises logic to automatically initiate a download of a remote banner located at a predefined address on the network to the memory, and logic to display a local banner stored in the memory on the display device upon a failure to download the remote banner to the memory. The banner update logic may further comprise logic to display the remote banner on the display device upon a successful download of the remote banner to the memory.

The present invention can also be viewed as providing a method in a client device for updating a banner in a graphical display on a display device. In this regard, the method can be broadly summarized by the following steps: automatically initiating a download of a remote banner located at a predefined address on a network to the client device for display in the graphical display on the display device, and displaying a local banner in the graphical display on the display device upon a failure to download the remote banner to the client device. The method may further comprise the step of displaying the remote banner in the graphical display on the display device upon a successful download of the remote banner over the network to the client device.

The various embodiments of the present invention disclosed herein address the concern of providing up-to-date advertising and information in the form of a graphical banner discussed above by facilitating the display of an up-to-date banner downloaded from a remote server maintained by the specific manufacturer or other entity.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
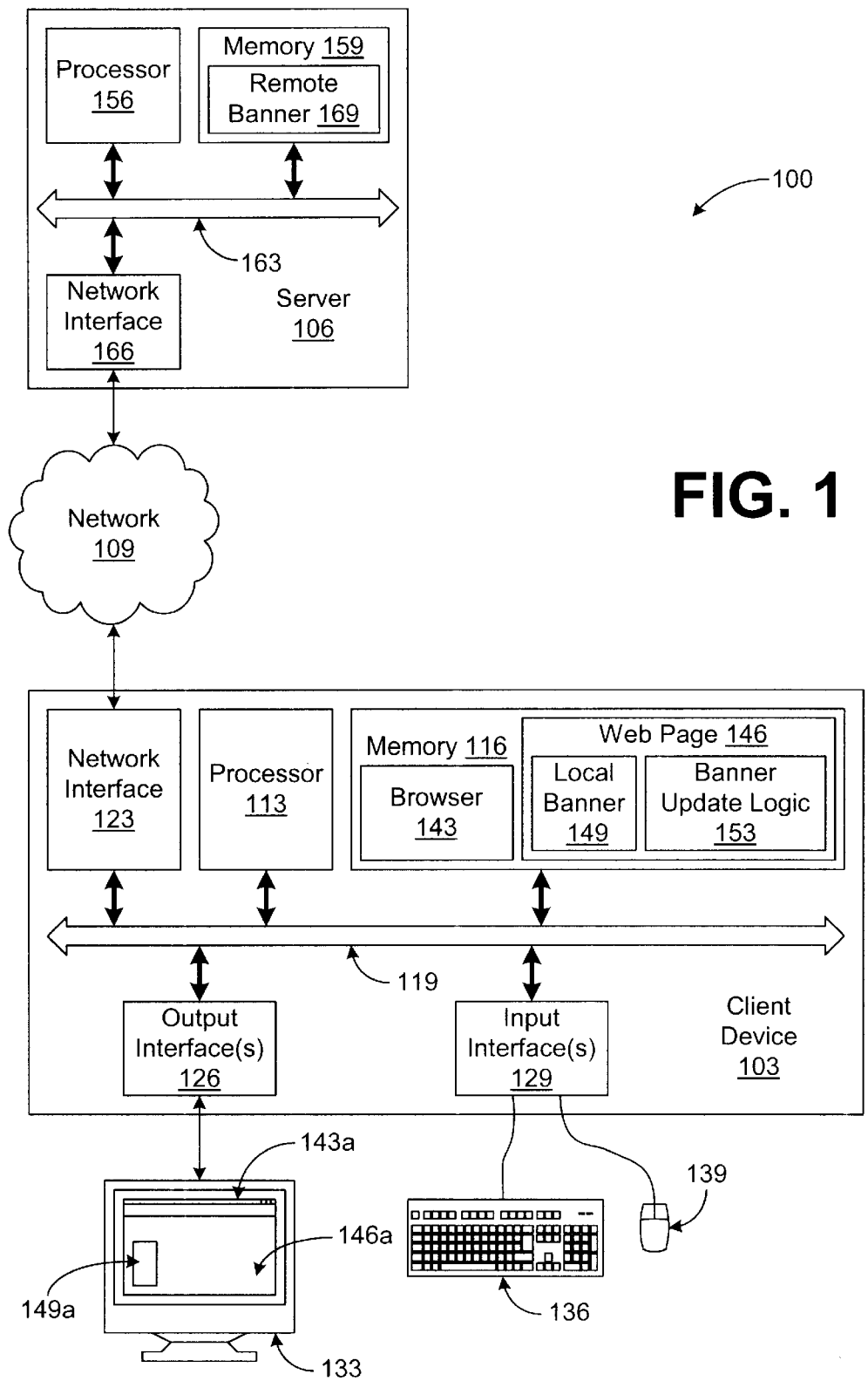
FIG. 1 is a block diagram of an image update system according to the present invention.

With reference to FIG. 1, shown is a block diagram of an image update system 100 according to an embodiment of the present invention. The image update system includes a client device 103, a server 106, and a network 109. The client device 103 may comprise, for example, a computer system as shown or a dedicated logical circuit that replaces the principle components of the computer system within the client device 103. In the preferred embodiment, the client device 103 includes a processor 113 and a memory 116, both of which are electrically coupled to a local interface 119. The local interface 119 may comprise, for example, a data bus with an accompanying control bus as is known by those skilled in the computer art. The local interface 119 provides a conduit for the transfer of data between the various components attached thereto. The client device 103 also comprises a network interface 123 that electrically couples the network 109 to the local interface 119 and makes data obtained from the server 106 via the network 109 available on the local interface 119. The network interface 123 may include, for example, an appropriate network card that may be employed to transmit and receive data access across the network 109. The network 109 may comprise, for example, the Internet, wide area networks, or other similar networks.

The client device 103 also includes one or more output interfaces 126 and one or more input interfaces 129. The output interfaces 126 electrically couple one or more output devices to the local interface 119. Once such output device is a display device 133 or other output device such as speakers, etc. The output interfaces 126 may comprise, for example, an interface card or other similar device. Likewise, the input interfaces 129 electrically couple one or more input devices to the local interface 119 as shown. The input devices may include, for example, a keyboard 136 or a mouse 139.

The memory 116 may comprise any one of or a combination of a number of memory devices, including both volatile and nonvolatile memory components. Volatile components are those that do not retain data values upon loss of power. Conversely, nonvolatile components retain data upon a loss of power. These volatile and nonvolatile components may include, for example, random access memory (RAM), read-only memory (ROM), hard disk drives, floppy disk drives, compact disk drives, tape drives, and other memory components.

Stored on the memory 116 is a browser 143 and a web page 146. Included within the web page 146 is a local banner 149 and banner update logic 153. Upon execution by the processor 113, the logic of the browser 143 generates a browser graphical user interface 143a to appear on the display device 133. The browser 143a may display a graphical web page 146a of which the graphical banner 149a is a part when chosen by the user who manipulates the browser graphical user interface 143a. The graphical web page 146a and the graphical banner 149a are generated from the web page 146 and the local banner 149. Also, as will be discussed, other banners may be displayed beyond the local banner 149 as controlled by the banner update logic 153.

The browser 143 may be employed to display various web pages that are downloaded to the client device 103 via the network 109 as known in the art. In addition, the browser 143 may also display the web page 146 that is stored in the memory 116 along with the local banner 149 as a graphical web page 146a with the graphical banner 149a.

The web page 146 and local banner 149 may be provided to the user on a portable memory medium such as a compact disk, floppy disk, or other medium and accessed accordingly. In particular, the web page 146 and the local banner 149 may be provided by a manufacturer in conjunction with a product or service purchased by the user of the client device 103. The web page 146 and the local banner 149 may be viewed by the user via the browser 143 to obtain information with regard to the product purchased, etc. The local banner 149 may be specifically employed to relay advertising or other information to the user, thereby providing a significant advantage to the manufacturer. Unfortunately, the substance of the advertisement contained in the local banner 149 may be obsolete by the time the user purchase the related product and installs it on the client device 103.

To address this concern, the image update system 100 includes a server 106 with a processor 156 and a memory 159, both of which are electrically coupled to a local interface 163. The local interface 163 may comprise, for example, a data bus with an accompanying control bus as known in the art. The server 106 also includes a network interface 166 that electrically couples the network 109 to the local interface 163, thereby making data available from the network 109 to the local interface 163 to be manipulated by the processor 156 and stored in the memory 159. Also, data may be transmitted to a remote location on the network 109 such as the client device 103 from the local interface 163 via the network interface 166. Stored on the memory 159 is a remote banner 169. The remote banner 169 may be downloaded from the server 106 to the client device 103 via the network 109 and ultimately displayed as the graphical banner 149a.

According to the present invention, the image update system 100 advantageously allows the graphical banner 149a to be generated using the local banner 149 or the remote banner 169. In particular, in one embodiment the web page 146 includes banner update logic 153 that facilitates downloading the remote banner 169 when the communications link between the client device and the network 109 is active. Otherwise, the web page 146 displays the local banner 149 on the display device 133. Thus, the image update system 100 allows the display of the remote banner 169 that may be updated by the manufacturer who maintains the server 106 whenever the user of the client device 103 creates an active link with the network 109. Otherwise, the local banner 149 is displayed on the display device 143 accordingly. Various versions of the banner update logic 153 will be described with reference to later figures.

Figure 2:
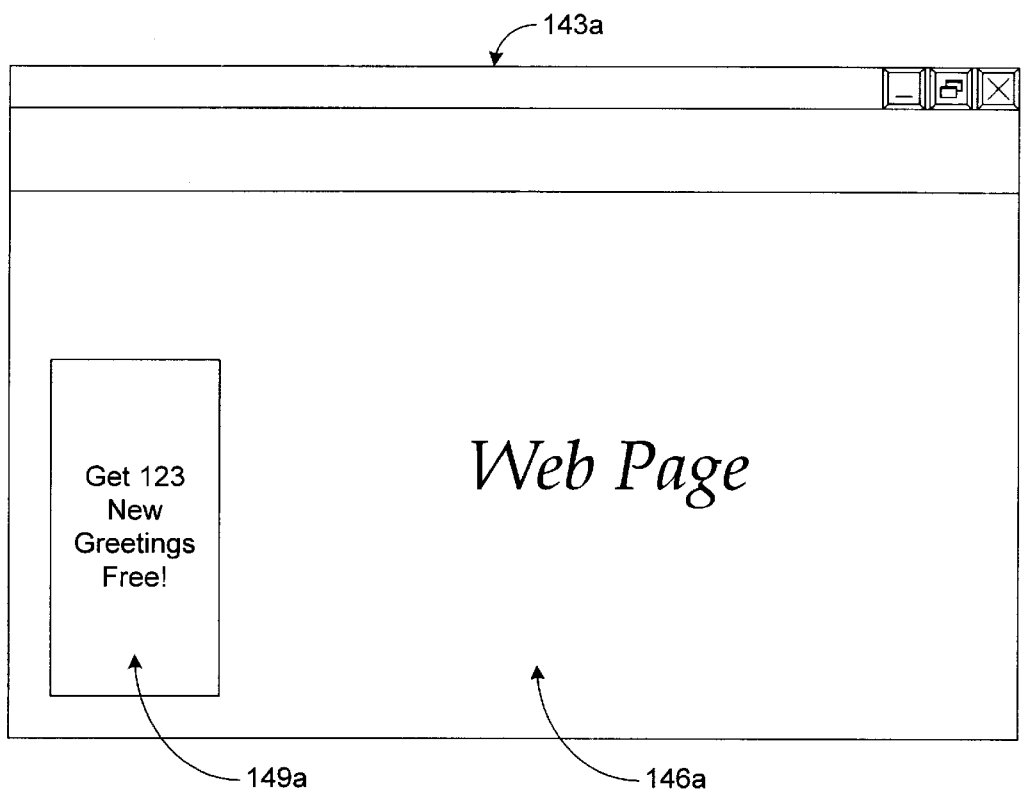
FIG. 2 is a drawing of a graphical user interface employed in the image update system of FIG. 1.

With reference to FIG. 2, shown is a further view of the browser graphical user interface 143a that displays the web page 146a and the graphical banner 149a that is embedded within the web page 146a. Thus, the graphical banner 149 provides a space that is embedded within the web page 146a in which services and products may be advertised.

Figure 3:
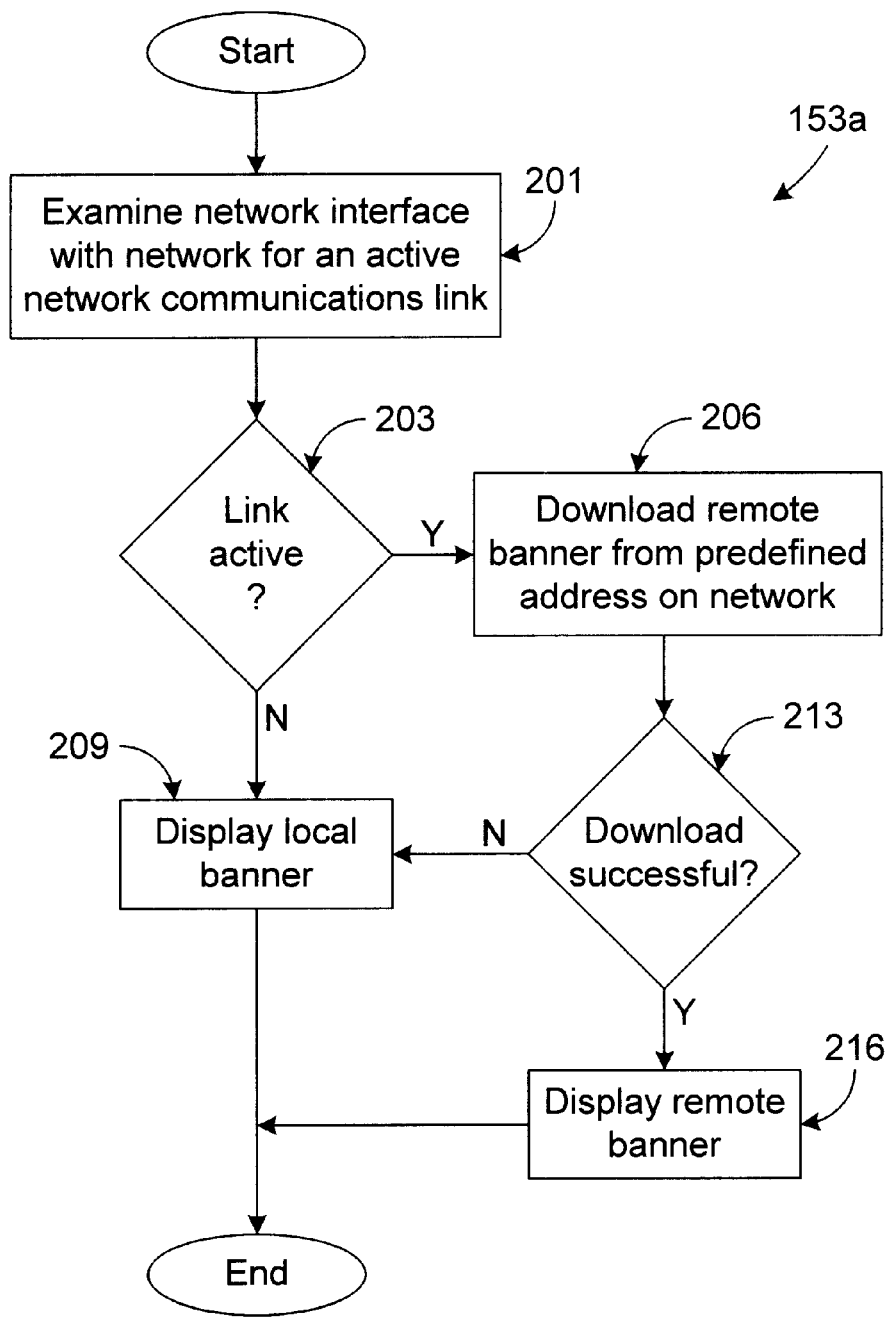
FIG. 3 is a flow chart of a first version of image update logic executed in the image update system of FIG. 1.

Turning to FIG. 3, shown is a flow chart of a first version of the banner update logic 153a according to an embodiment of the present invention. The banner update logic 153a provides a distinct advantage in that it automatically initiates a download of the remote banner 169 (FIG. 1) from the server (106) upon the detection of an active network communications link with the network 109 (FIG. 1) via the network interface 123 (FIG. 1). Beginning with block 201, the banner update logic 153a examines the network interface 123 (FIG. 1) for an active communications link with the network 109. This may be accomplished by examining the state of the network interface 123, or by interfacing with appropriate communications logic stored in the memory 116 that controls the network interface 123 and communication with the network 109. Thereafter, in block 203, if an active communications link is detected, then the banner update logic 153a progresses to block 206. Otherwise, the banner update logic 153a progresses to block 209. In block 206, the remote banner 169 (FIG. 1) is downloaded from a predefined address on the network 109. The predefined address identifies the remote banner 169 in the server 106. The remote banner 169 is preferably downloaded to volatile memory in the memory 116 of the client device 103 so as to avoid storage of the remote banner 169 in nonvolatile memory against the wishes of the user. Thereafter, the banner update logic 153a progresses to block 213 as shown.

In block 209, given that no active communications link was found in block 203, the local banner 149 (FIG. 1) is displayed as the graphical banner 149a (FIG. 1). Thereafter, the banner update logic 153 ends as shown.

Referring back to block 213, if the remote banner 169 was successfully downloaded from the server 106 into the client device 103, then the banner update logic 153a progresses to block 216. Otherwise, the banner update logic 153a moves to block 209 where the local banner 149 is displayed in the display device 133. In block 216, the remote banner 169 is displayed as the graphical banner 149a assuming that the download of the remote banner 169 from the server 106 to the client device 103 was successful in block 213. In this manner, up-to-date information may be relayed in the graphical banner 149 to the user of the client device 103. Thereafter, the banner update logic 153 ends.

Figure 4:
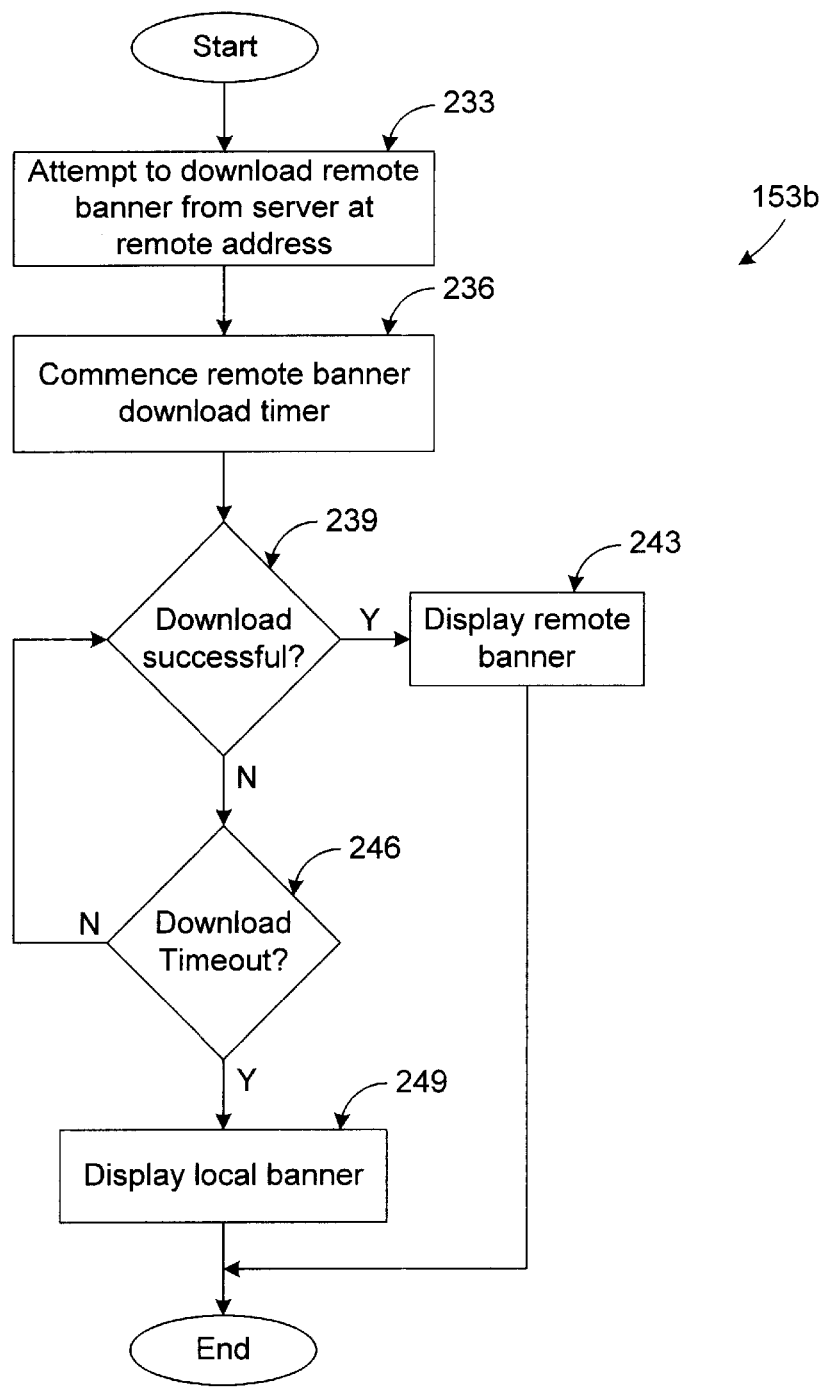
FIG. 4 is a flow chart of a second version of the image update logic executed in the image update system of FIG. 1.

With reference to FIG. 4, shown is a flow chart of a second version of the banner update logic 153b according to another embodiment of the present invention. The banner update logic 153b differs from the banner update logic 153a (FIG. 3) in the procedure employed to determine whether the remote banner 169 (FIG. 1) can be displayed as the graphical banner 149a (FIG. 1). Specifically, the banner update logic 153b attempts to download the remote banner 169 for a predetermined period of time as opposed to determining an existence of an active communications link with the network 109 (FIG. 1). Beginning with block 233, the banner update logic 153b attempts to download the remote banner 169 from the server 106 that is identified on the network 109 by an appropriate network address. Thereafter, in block 236, a remote banner download timer is set to begin tolling a download timeout. Then, in block 239, if the remote banner 169 is downloaded, the banner update logic 153b moves to block 243 in which the remote banner 169 is displayed as the graphical banner 149a (FIG. 1). Thereafter, the banner update logic 153 ends accordingly.

If, in block 239, the remote banner 169 has not been downloaded, then the banner update logic 153b progresses to block 246 in which it is determined whether the download timeout has tolled, the download timeout comprising a predetermined period of time. If the download timeout has not tolled in block 246, then the banner update logic 153b reverts back to block 239. Otherwise, the banner update logic 153b moves to block 249 in which the local banner 149 (FIG. 1) is displayed as the graphical banner 149a. Thus, the banner update logic 153b attempts to download the remote banner for display as the graphical banner 149a until the download timeout occurs, at which time the local banner 149 is displayed instead.

Figure 5:
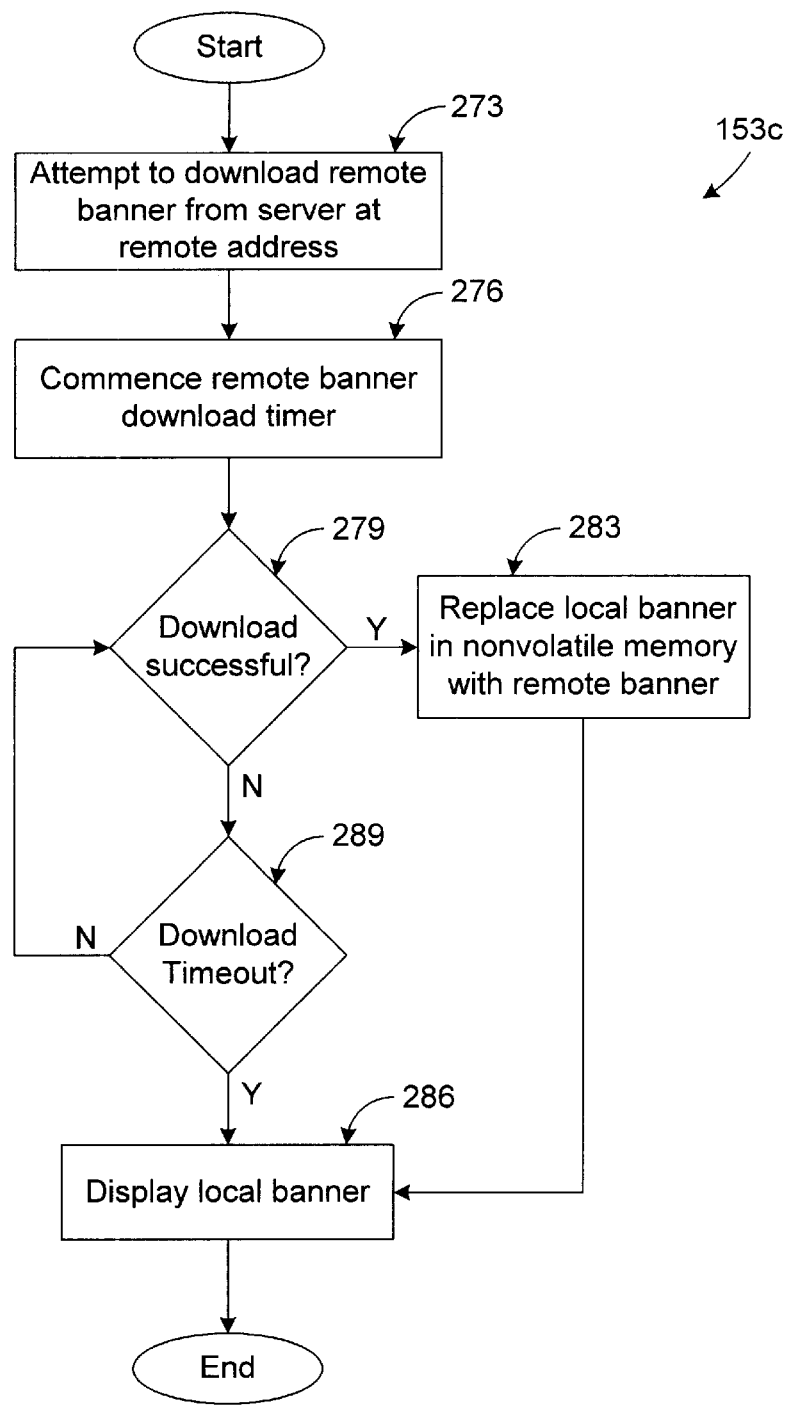
FIG. 5 is a flow chart of a third version of the image update logic executed in the image update system of FIG. 1.

Turning to FIG. 5, shown is a flow chart of a third version of the banner update logic 153c according to yet another embodiment of the present invention. The banner update logic 153c advantageously provides for a constant update of the local banner 149 (FIG. 1) with the remote banner 169 (FIG. 1) to provide a continual update of the local banner 149 for display as the graphical banner 149a (FIG. 1). Beginning with block 273, the banner update logic 153c attempts to download the remote banner 169 from the server 106 (FIG. 1) at the corresponding address on the network 109 (FIG. 1). Thereafter, in block 276, the remote banner download timer is triggered to begin tolling the download timeout. Then, in block 279, it is determined whether the remote banner 169 has been successfully downloaded into the client device 103. If the download was successful, then the banner update logic 153c progresses to block 283 in which the local banner 149 is replaced in a nonvolatile portion of the memory 116 by the downloaded remote banner 169. Thereafter, the banner update logic 153c progresses to block 286 in which the new local banner 149 is displayed on display device 133 as the graphical banner 149a. The banner update logic 153c then ends accordingly.

Referring back to block 279, if the remote banner 169 is not successfully downloaded into the client device 103, then the banner update logic 153c progresses to block 289 in which the banner update logic 153c determines whether a download timeout has occurred. In this case, the banner update logic 153c progresses to block 286 to display the local banner 149 accordingly. Otherwise, the banner update logic 153c reverts back to block 279 to determine once again whether the remote banner 169 has been successfully downloaded from the server 106.

The banner update logic 153c provides for the replacement of the local banner 149 by the remote banner 169 when downloaded. In this situation, the remote banner 169 replaces the local banner 149 in nonvolatile memory such as, for example, a hard drive, etc. Many users may not wish for data to be written to the hard drive or other nonvolatile memory as such and consequently, during installation of the web page 146 and browser 143 on the client device 103 it may be desirable to poll the user to determine whether or not it would be permissible to replace the local banner 149 with the remote banner 169 in nonvolatile memory. Also, the download timeout employed in the banner update logic 153c may be replaced by the logic to determine an existence of an active communications link in similar fashion to the banner update logic 153a (FIG. 3).

Figure 6:
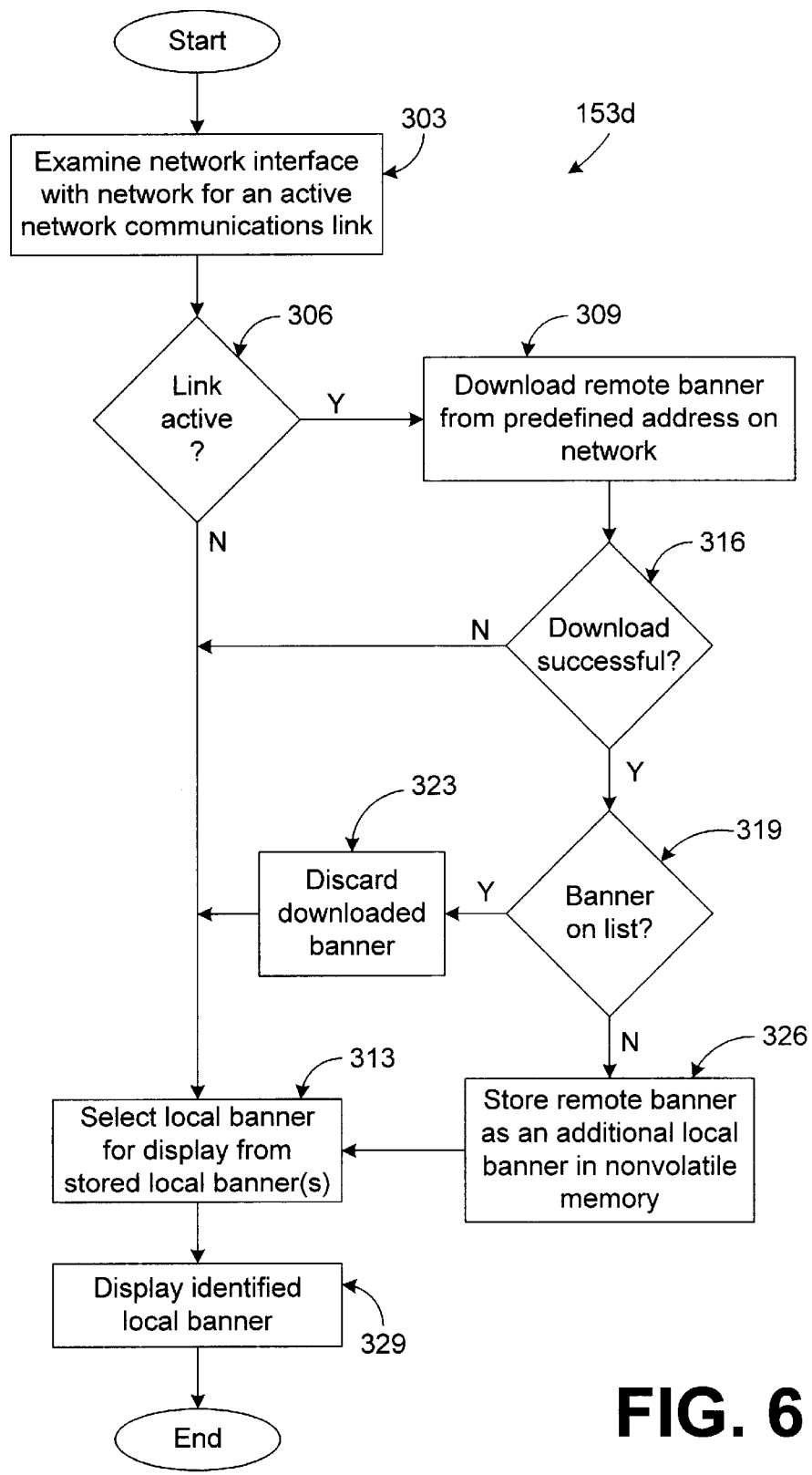
FIG. 6 is a flow chart of a fourth version of the image update logic executed in the image update system of FIG. 1.

With reference to FIG. 6, shown is a flow chart of a fourth version of the banner update logic 153d according to another embodiment of the present invention. According to the banner update logic 153d, one or more local banners 149 (FIG. 1) are maintained on a nonvolatile portion of the memory 116 (FIG. 1), one of which is selected at a time to display as the graphical banner 149a (FIG. 1). The remote banner 169 (FIG. 1) is downloaded and added to the list of local banners 149 if it does not already exist on the list.

To this end, the banner update logic 153d begins with block 303 in which the network interface is examined for an active network communications link. Thereafter, in block 306, if an active communications link with the network 109 (FIG. 1) is detected, the banner update logic 153d moves to block 309 in which the remote banner 169 (FIG. 1) is downloaded from the server 106 (FIG. 1) as identified by a predefined address on the network 109. If, in block 306, there is no active communications link detected, then the banner update logic 153d progresses to block 313 in which a local banner 149 selected from a number of local banners 149 stored on the memory 116.

Referring back to block 309, once an attempt to download the remote banner 169 has been undertaken in block 309, the banner update logic 153d moves to block 316 in which it is determined whether the download of the remote banner 169 to the client device 103 (FIG. 1) has been successful. If not, the banner update logic 153d moves to block 313 accordingly. Otherwise, the banner update logic 153 progress to block 319 in which it is determined whether the remote banner 169 that was downloaded already exists in the memory 116 from a previous download experience. If so, then the banner update logic 153d moves to block 323 in which the downloaded remote banner 169 is discarded. Thereafter, the banner update logic 153d moves to block 313.

If, in block 319 the downloaded remote banner 169 had not been previously downloaded, then the banner update logic 153d progresses to block 326 in which the remote banner 169 that was downloaded to the memory 116 of the client device 103 is stored along with preexisting local banner(s) 149 stored in the nonvolatile portion of the memory 116. Thereafter, the banner update logic 153d moves to block 313.

In block 313, the selection of a particular local banner 149 to display as the graphical banner 149a may be made using any selection scheme, such as random selection or consecutive selection, etc. Once a local banner 149 is selected from any one of the number of local banners 149 stored in the nonvolatile portion of the memory 116, the banner update logic moves to block 329 in which the selected local banner 149 is displayed as the graphical banner 149a. Thereafter, the banner update logic 153d ends accordingly.

Referring back to FIG. 1, the various embodiments of the banner update logic 153 provide a distinct advantage in that a manufacturer may display up-to-date advertising or information in the graphical banner 149a in conjunction with the purchase of a particular product from the manufacturer by the user. This is accomplished even with what are often relatively long lead times typically necessary to supply a particular product to which the web page 146 and local banner 149 are related.

Also, the various embodiments of the banner update logic 153 described above may also include logic to detect an incompatibility between the remote banner 169 downloaded into the client device 103 and the graphical banner 149a displayed on the display device 133. In particular, inconsistent sizes in the respective banners may exist, etc. In such a case, it would be preferable to display the local banner 149.

In addition, the banner update logic 153 of the present invention can be implemented in hardware, software, firmware, or a combination thereof. In the preferred embodiment(s), the banner update logic 153 is implemented in software or firmware that is stored in a memory and that is executed by a suitable instruction execution system. If implemented in hardware, as in an alternative embodiment, the banner update logic 153 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow charts of FIGS. 3–6 show the architecture, functionality, and operation of possible implementations of the banner update logic 153. In this regard, each block represents a module, segment, or portion of code, which comprises one or more executable instructions for implementing the specified logical function(s). Note that in some alternative implementations, the functions contained in the blocks may occur out of the order noted in FIGS. 3–6. For example, two blocks shown in succession in FIGS. 3–6 may in fact be executed substantially concurrently or the blocks may sometimes be executed in the reverse order, depending upon the functionality involved.

The banner update logic 153, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A method in a client device for updating a banner on a display device, comprising the steps of:

accessing a web page stored in a memory in the client device with a browser, the web page including a local banner;

detecting an existence of an active communications link in the client device with a network;

automatically initiating a download of a remote banner located at a predefined address identified in the web page on a network to the client device when the active communications link exists;

displaying the remote banner in the web page in the place of the local banner on a display device after the download of the remote banner to the client device; and displaying the local banner in the web page on the display device when the active communications link does not exist.

2. The method of claim 1, further comprising the step of detecting a display incompatibility of the remote banner downloaded from the predefined address on the network.

3. The method of claim 1, further comprising the step of ceasing the initiation of the download of the remote banner from the predefined address on the network after a predefined period of time.

4. The method of claim 1, further comprising displaying the local banner in the web page on the display device upon a failure to download the remote banner to the client device when the active communications link exists.

5. A system for updating a banner in a graphical display, comprising:

a processor electrically coupled to a local interface;

a memory electrically coupled to the local interface;

a network interface configured to electrically couple a network to the local interface;

a display device electrically coupled to the local interface;

a browser stored in the memory and executable by the processor;

a web page stored in the memory, the web page including a local banner; and banner update logic included in the web page that is executable by the browser, the banner update logic comprising:

logic to detect an existence of an active communications link with the network via the network interface;

logic to automatically initiate a download of a remote banner located at a predefined address identified in the web page on the network to the memory if the active communications link with the network exists;

logic to display the remote banner in the web page in the place of the local banner on the display device after a successful download of the remote banner to the client device; and logic to display the local banner in the web page on the display device if the active communications link with the network does not exist.

6. The system on claim 5, wherein the banner update logic further comprises logic to detect a display incompatibility of the remote banner downloaded from the predefined address on the network.

7. The system of claim 5, wherein the banner update logic further comprises logic to cease the initiation of the download of the remote banner from the predefined address on the network after a predefined period of time.

8. The system of claim 1, further comprising logic to display the local banner in the web page on the display device upon a failure to download the remote banner to the client device when the active communications link exists.

9. A banner update system in a client device, comprising:

means for displaying a web page on a display device associated with the client device, wherein the web page is stored in a memory in the client device, the web page including a local banner;

means associated with the web page for detecting an existence of an active communications link in the client device with a network;

means associated with the web page for automatically initiating a download of a remote banner located at a predefined address identified in the web page on a network to the client device for display on the display device if the active communications link in the client with the network exists;

means for displaying the remote banner in the web page in the place of the local banner on the display device after a successful download of the remote banner to the client device; and means for displaying the local banner in the web page on the display device if the active communications link with the network does not exist.

10. The system of claim 9, further comprising means for detecting a display incompatibility of the remote banner downloaded from the predefined address on the network.

11. The system of claim 9, further comprising means for ceasing the initiation of the download of the remote banner from the predefined address on the network after a predefined period of time.

12. The system of claim 9, further comprising means for displaying the local banner in the web page on the display device upon a failure to download the remote banner to the client device when the active communications link exists.

13. A method for presenting a banner to a user of a computer system, comprising:

storing a local banner in a non-volatile memory of the computer system;

automatically determining whether an active network communications link with a network is present in the computer system;

displaying the local banner to the user on a display device if the active network communications link is not present;

downloading a remote banner from a remote server on the network if the active network communications link is present;

replacing the local banner with the remote banner in the non-volatile memory after the remote banner is downloaded from the remote server; and displaying the local banner to the user on the display device after the local banner has been replaced by the remote banner.

14. A method of claim 13, further comprising:

determining whether a download timeout has occurred before the remote banner is successfully downloaded from the remote server on the network if the active network communications link is present; and displaying the local banner to the user on a display device if the download timeout has occurred before the remote banner has been successfully downloaded from the remote server.

15. A method for presenting one of a number of banners to a user of a computer system, comprising:

storing the number of local banners in a non-volatile memory of the computer system;

automatically determining whether an active network communications link is present in the computer system;

if the active network communications link is not present, then selecting one of the local banners for display on a display device; and if the active network communications link is present, then downloading a remote banner from a remote server on a network if the active network communications link is present;

determining if the remote banner is already stored in the non-volatile memory as one of the local banners after the remote banner has been successfully downloaded to the computer system;

storing the remote banner in the non-volatile memory if the remote banner is not already stored in the non-volatile memory as one of the local banners; and selecting one of the local banners for display on a display device after the remote banner is stored in the non-volatile memory as one of the local banners.

16. A system for presenting one of a number of banners to a user on a display device, comprising:

a processor circuit having a processor and a memory;

a network interface adapted to couple the processor circuit to a network;

banner update logic stored in the memory and executable by the processor, the banner update logic comprising:

logic that stores the number of local banners in a non-volatile portion of the memory;

logic that automatically determines whether an active network communications link with the network is present;

logic that selects one of the local banners for display on the display device if the active network communications link is not present;

logic that downloads a remote banner from a remote server on the network if the active network communications link is present;

logic that determines if the remote banner is already stored in the non-volatile portion of the memory as one of the local banners after the remote banner has been successfully downloaded;

logic that stores the remote banner in the non-volatile portion of the memory if the remote banner is not already stored in the non-volatile portion of the memory as one of the local banners; and logic that selects one of the local banners for display on the display device after the remote banner is stored in the non-volatile portion of the memory as one of the local banners.

17. A system for presenting one of a number of banners to a user, comprising:

means for storing the number of local banners in a non-volatile portion of a memory;

means for automatically determining whether an active network communications link with a network is present;

means for selecting one of the local banners for display on a display device if the active network communications link is not present;

means for downloading a remote banner from a remote server on the network if the active network communications link is present;

means for determining if the remote banner is already stored in the non-volatile portion of the memory as one of the local banners after the remote banner has been successfully downloaded;

means for storing the remote banner in the non-volatile portion of the memory if the remote banner is not already stored in the non-volatile portion of the memory as one of the local banners; and means for selecting one of the local banners for display on the display device after the remote banner is stored in the non-volatile portion of the memory as one of the local banners.

* * * * *